Oct. 28, 1958
H. R. McBRIDE, JR
2,857,874
HATCH COVER
Filed Jan. 20, 1955
2 Sheets-Sheet 1
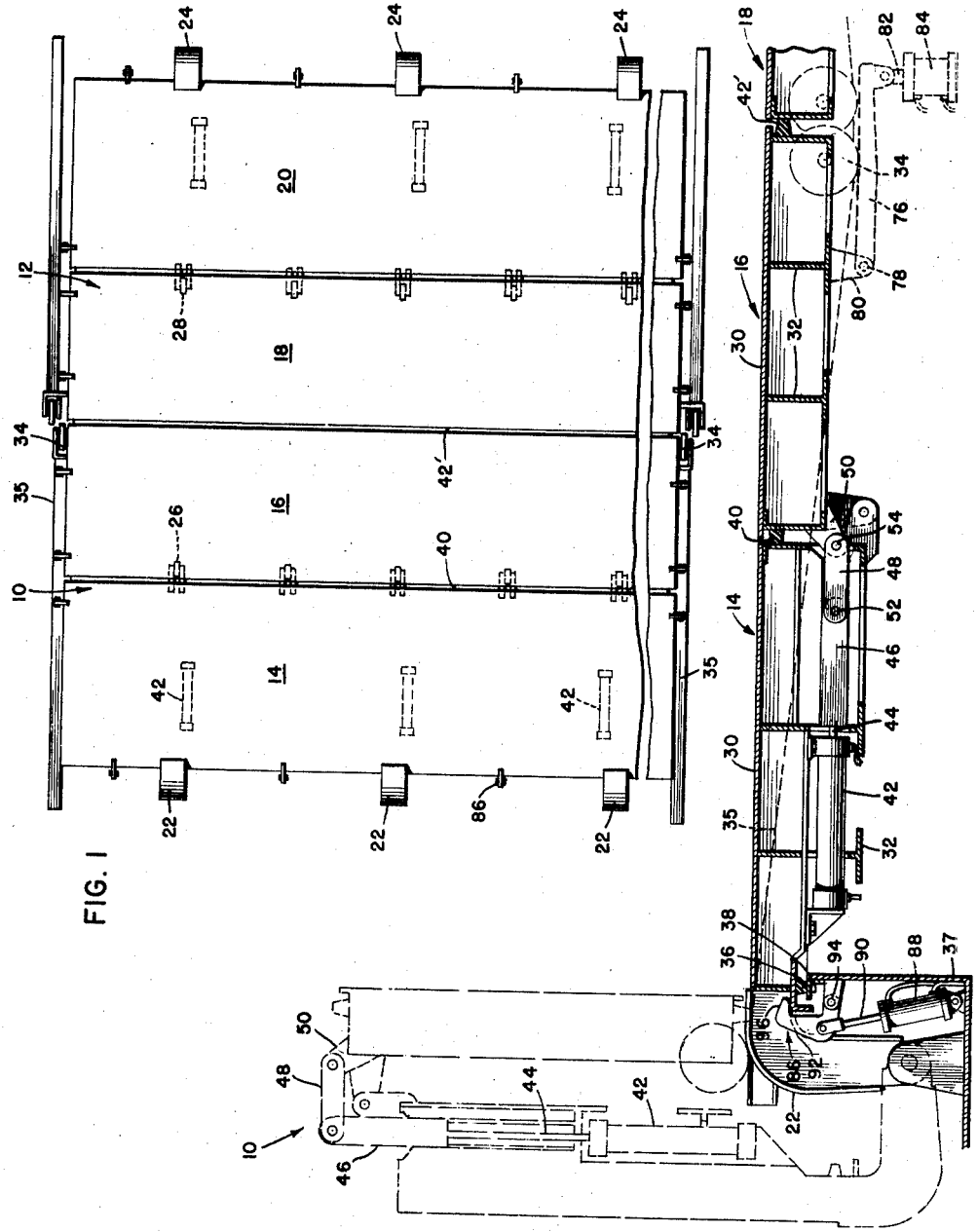
INVENTOR
HOWARD R. McBRIDE, JR.
BY *Alvin Browdy*
ATTORNEY Oct. 28, 1958  H. R. McBRIDE, JR  2,857,874
HATCH COVER
Filed Jan. 20, 1955  2 Sheets-Sheet 2
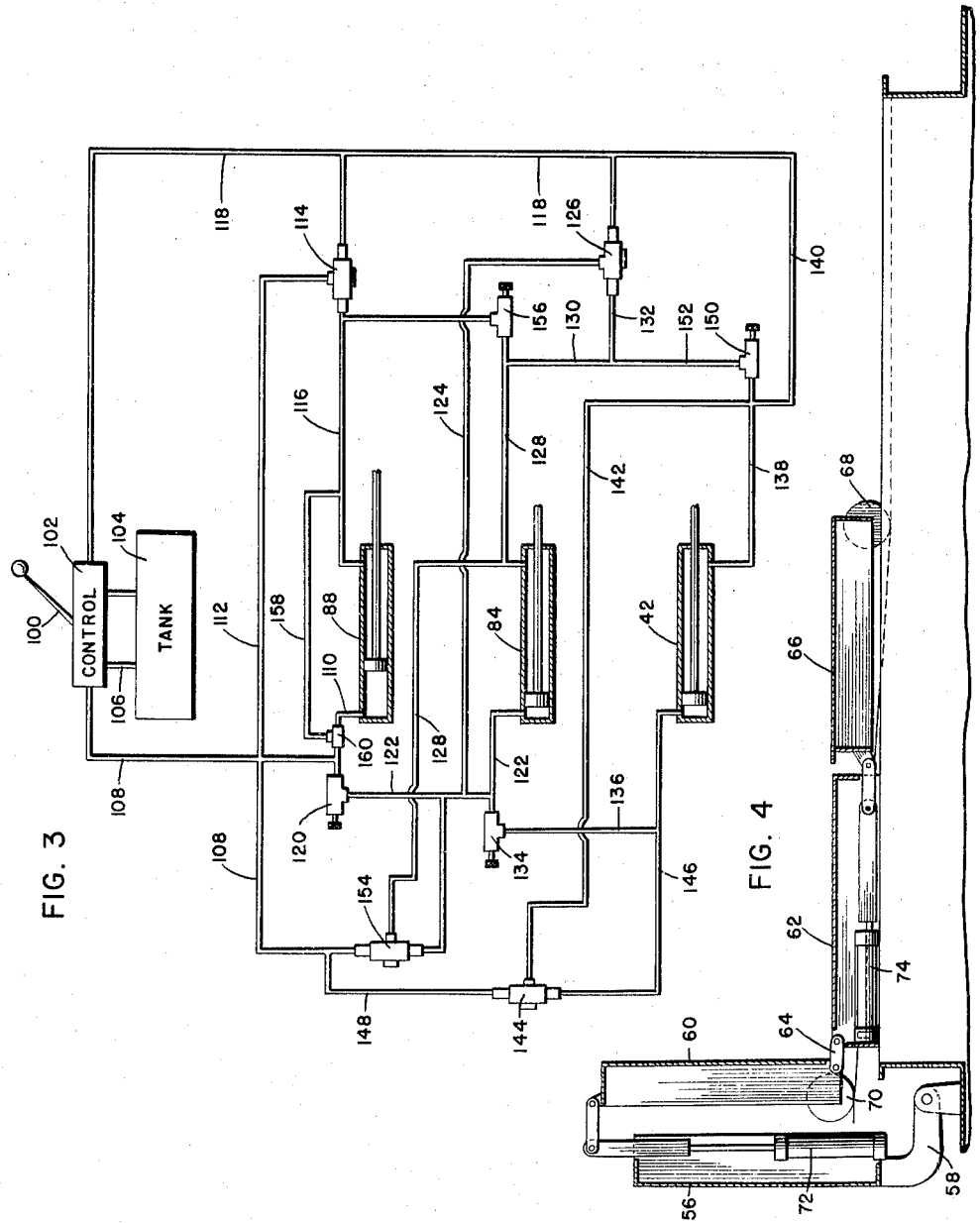
INVENTOR
HOWARD R. McBRIDE, JR.
BY *Alvin Browdy*
ATTORNEY

2,857,874

HATCH COVER

Howard R. McBride, Jr., New York, N. Y., assignor to Karl W. Jernstrom, Sparta, N. J.

Application January 20, 1955, Serial No. 483,090

6 Claims. (Cl. 114—202)

This invention relates to power actuated hatch covers for ships and more particularly to articulated hatch covers in which all the steps of opening and closing are sequentially acomplished by hydraulic means.

The maintenance of a large ship in port is very costly and the time required for loading and unloading must be reduced to a minimum. Originally, it was customary to close cargo hatches with wood or metal planks covered by tarpaulin. Due to the time and labor required for opening and closing of the hatches using planks and tarpaulin, large modern vessels are now being equipped with articulated hatch covers which may be opened and closed more readily. Such covers include a pair of oppositely disposed articulated hatch cover sections hinged at one end to the deck, and provided with wheels at the free ends thereof. Such covers in closed position will bridge the hatchway and yet, when opened and folded, will occupy but little of the deck area. A gasket arrangement is usually provided on the underside of the cover and when in closed position the cover is lowered until the gaskets are engaged by suitable weatherstripping to form a watertight seal between the coaming and the cover. Further, suitable dogs are usually provided for locking the covers tightly onto the weatherstripping.

With such covers, since the hatchway lies in a horizontal plane and the hatch cover sections are necessarily very heavy, there has been a great deal of difficulty in lifting these covers out of the hatchway opening. Usually, the dogs are first manually operated to release the cover, after which suitable jacking means are operated to raise the cover slightly so as to break the seal between the gasket and the weatherstripping. The hatch cover sections are then lifted with a derrick or hoist which is attached to the intermediate joints of the hatch cover sections. This is a cumbersome time-consuming job.

The use of hydraulic pressure for accomplishing the operation of the hatch covers on a two-panel cover has been previously proposed, but to date no practical, workable system has been devised for accomplishing the dogging, jacking and operating steps on a two-panel, four-panel, or longer, cover entirely automatically and sequentially.

It is therefore an object of the present invention to provide an articulated hatch cover which can be dogged, jacked and operated by an improved hydraulic system.

It is a further object of the present invention to provide an articulated hatch cover with a plurality of pairs of panels in a section thereof which can be actuated by an improved hydraulic system.

It is a still further object of the present invention to provide an improved hydraulic arrangement for sequentially actuating an articulated hatch cover.

It is a further object of the present invention to provide an improved hydraulically operated dogging arrangement for a hatch cover.

It is a still further object of the present invention to provide an improved hydraulically operated jacking arrangement for a hatch cover.

Another object of the invention is to provide an improved control system for hydraulically opening and closing an articulated hatch cover.

Other objects and the nature and advantages of the instant invention will be apparent from the following description taken in conjunction with the accompanying drawings, wherein:

Fig. 1 is a plan view of a hatch cover in the closed position, with two panels to each section of the cover;

Fig. 2 is a diagrammatic elevational section of one-half of the hatch showing the cover in the open position in dotted lines;

Fig. 3 is a diagrammatic illustration of the hydraulic control system; and

Fig. 4 is a diagrammatic elevational section showing a four-panel hatch cover section in process of being opened.

Referring to the drawings, the general arrangement of the hatch when in the closed position is shown in Fig. 1. Although this drawing illustrates a two-section cover in which each section has two panels, it should be understood that the invention may well comprise a hatch cover of one or more sections, each having two panels, four panels, or greater. In Fig. 2, the hatch cover is a two-section cover in which each section has two panels, wherein the meeting edge of the two sections is in the middle of the hatch, and for all practical purposes here, each of the two sections is similar to the other except for being reversed one to the other. The sections are identified as 10 and 12, respectively. Section 10 includes outer panel 14, and inner panel 16, whereas section 12 includes inner panel 18 and outer panel 20. The outer panels are hinged to the deck by main hinges 22 and 24, respectively. The outer panels 14 and 20 are hinged to the inner panels 16 and 18 by means of intermediate hinges 26 and 28, respectively. The intermediate hinges 26 and 28 extend below the top surface of the panels and permit the joint to pivot upwardly with the underside of the inner and outer panels moving together.

As is illustrated in Fig. 2, each of the panels is provided with a flat, unobstructed upper surface plate 30, supported by a plurality of stiffeners 32. Rollers 34 are provided at the outer sides of the inner panels in a conventional manner. Tracks 35 are provided alongside the coaming 37 to accommodate the rollers during the opening and closing of the cover sections. A gasket arrangement 36 is provided about the outer circumference of the lower surface of the hatch cover for engagement with a member 38 adjacent the coaming. A gasket arrangement 40 is provided across the joint of the panels 14 and 16, and a gasket arrangement 42' is provided across the meeting edge of the panels 16 and 18. This combination of gaskets results in a watertight hatch when the cover is closed and secured in place.

The actuating mechanisms for opening and closing the cover sections are integrally mounted on the underside of the outer panels 14 and 20. The actuating mechanism includes a plurality of hydraulic cylinders 42 in which the pistons and rods 44 travel. The piston rod 44 is attached at its other end to a link 46. The link 46 is pivotally attached at its other end to a cross bar 48 which is pivotally connected at its other end to a bracket member 50 which is integrally attached to the edge of the adjacent inner panel 16. It can be seen by reference to Fig. 2 that in the closed position, the hydraulic cylinder 42, piston rod 44, link 46 and cross bar 48 are all in alignment. During the opening of the hatch, the cross bar 48 is restrained only by its pivot points 52 and 54 and is free to seek its natural compensating angle throughout the full operating cycle. In the fully open position shown in dotted lines in Fig. 2, the cross bar 48 is at right angles to the link 46 and to the bracket member 50.

The operating mechanism described above is more completely described in applicant's copending application Serial No. 442,603, filed July 12, 1954.

As shown in Fig. 1, three hydraulic cylinders are mounted in each of the outer panels. The cylinders in each panel are all interconnected and hydraulic fluid is directed to either side of the pistons within the cylinders, as will be described hereinafter.

In the modified form of the invention shown in Fig. 4, the hatch cover consists in a single section with four panels therein. The outer panel 56 is hinged at its outer end to the deck by main hinges 58, and at its inner end to an adjoining panel 60. Panel 60 is hinged at its inner end to a panel 62 by means of a link hinge 64. Panel 62 is hinged at its inner end to panel 66. Panel 66 carries rollers 68 at its free end, and panel 60 carries rollers 70 at its inner end. An operating mechanism 72 which includes a plurality of hydraulic cylinders, pistons, links and cross bars similar to that described above and in applicant's copending application Serial No. 442,603 is mounted in panel 56 and a similar mechanism 74 is mounted in panel 62. In opening the cover, hydraulic fluid is first admitted to the hydraulic cylinders of the mechanism 72 until panels 56 and 60 have traveled to the fully opened position shown in Fig. 4, while the panels 62 and 66 are traveling on rollers 68 in a horizontal position. At this point, hydraulic fluid is admitted to the hydraulic cylinders of mechanism 74 until panels 62 and 66 are also in the open position. In closing the cover, the reverse operations take place.

In the closed position, the rollers 34 are received on a jacking device 76 shown in Fig. 2, which may be hydraulically actuated to lower the wheels so as to permit the gasket 36 to seal the coaming. As illustrated, the jacking device is pivoted at 78 at one end to a bracket 80 and is attached at its other end to a piston rod 82 which is attached to a piston which travels in a cylinder 84. Hydraulic fluid may be directed to opposite sides of the piston in the cyilnder 84 to raise or lower the wheels as desired. Any type of hydraulically operated jacking device may be used.

When the wheels are in the lowered position, the dogging devices 86 can be actuated to lock the cover in the closed sealed position. As shown in Fig. 2, the dogging devices 86 are located at spaced intervals about the circumference of the coaming, and each comprises a hydraulic cylinder 88, piston rod 90 and pivoted dog 92. If desired, one cylinder may operate a plurality of dogs. The dog 92 pivots about pivot point 94 and extends the hooked end 96 into engagement with the hatch cover. Hydraulic fluid may be directed to opposite sides of the piston in the cylinder 88 to raise or lower piston rod 90 and cause the pivotal movement of the dog 92.

With the hatch cover shown in Fig. 2 in the closed, sealed and dogged position, in order to open the hatch cover, the following steps must be accomplished in the sequence indicated with each step beginning after completion of the preceding step. First, the dogging devices 86 must be actuated to unlatch the hooked ends 96 of the dogs 92 from the hatch cover. The second step is the operation of the jacking device 76 to raise the rollers 34 up to the level of the track, thereby breaking the seal between the gaskets 36 and the coaming. The third step is the actuation of the operating mechanisms by operating cylinders 42 to move the cover to the dotted line position of Fig. 2. It is obvious that each step cannot be accomplished until after completion of the preceding step. In closing the hatch cover, the reverse steps take place. First, the operating mechanisms through cylinders 42 move the cover to the closed position. The jacking devices 76 then lower the rollers, thereby sealing the hatch, and finally the dogging devices 86 are actuated to latch the dogs onto the hatch cover.

Reference to Fig. 4 shows a four-step sequence in the operation of a four-paneled section watertight cover with dogs and jacking devices. In opening such a cover, the dogs would be first unlatched, followed by the raising of the jacking devices. The actuating mechanism 72 would next be operated to the position shown in Fig. 4, and the final step would be the actuation of mechanism 74.

In the case of a hatch cover as illustrated in Fig. 4 without the use of hydraulically actuated dogs and jacking devices, a two-step operation would suffice, wherein the actuating mechanisms 72 and 74 would be operated in sequence.

Each of the steps of operation is automatically made sequentially by means of the hydraulic system shown in Fig. 3. The control lever 100 is moved to the opening position whereupon the steps outlined above are performed in sequence until the cover is opened. By moving the lever 100 to the closed position, the reverse steps take place sequentially until the cover is closed, sealed and dogged.

The hydraulic system described in Fig. 3 includes a control valve 102, a tank 104 carrying a supply of hydraulic fluid, and a plurality of hydraulic cylinders and counterbalance valves. A continuously operated pump may be used in place of the tank 104. The control valve 102 may be any conventional four-way valve similar to the four-way valve 40 as shown in the Esch Patent 2,301,028.

In operation, when the lever 100 is moved to the raised position, control valve 102 moves to a position so that fluid flows from hydraulic tank 104 through line 106, control valve 102, lines 108 and 110 to the left side of hydraulic cylinders 88, which actuate the dogging devices. Fluid also flows through line 112 to the pilot on valve 114, causing valve 114 to open and permit flow of fluid from the right side of hydraulic cylinder through line 116, valve 114 and line 118 back through control valve 102 to tank 104. The piston in cylinder 88 thus travels to the end of its stroke. The movement of the piston in cylinder 88 results in unlatching of the dogging devices. At the completion of the stroke, a surplus pressure builds up in line 108 sufficient to open valve 120. Fluid flows through valve 120 and line 122 to the next hydraulic cylinders 84 on the left of the piston therein. The cylinders 84 operate the jacking device. Pressure in line 124 opens valve 126, thereby permitting the fluid to leave the right end of the cylinder 84 through lines 128, 130, 132 and 118 to the control valve 102 and tank 104. When the piston in cylinder 84 has travelled to the end of its stroke, the jacking devices have been raised. Pressure now builds up in line 122 sufficient to operate valve 134, permitting the flow of fluid therethrough through line 136 to the left side of cylinders 42. Cylinders 42 operate to open the hatch covers. The fluid from the right of cylinders 42 bleeds back to the tank through lines 138, 140 and 118.

When the lever 100 is moved to the lower position, the control valve 102 shifts to reverse the flow of fluid through lines 118, 140 and 138 to cylinder 42 causing the piston rod to retract. The pressure in pilot line 142 opens valve 144 to bleed the opposite side of the cylinder through line 146, valve 144 and lines 148 and 108 and control valve 102 into tank 104. The movement of the piston rod results in the closing of the cover. The pressure now builds up in line 138 until valve 150 unloads the fluid through lines 152, 130 and 128 to the right side of cylinder 84 causing the piston to retract. Pressure in line 128 opens valve 154 permitting fluid from the left of the piston to flow through line 122, valve 154 and line 108 back through control valve 102 to tank 104. The movement of this piston rod causes the jacking device to lower. The excess pressure building up in line 128 unloads valve 156 through line 116 into the right end of cylinder 88. The pressure in line 158 causes check valve 160 to open allowing the opposite end of the cylinder 88 to bleed through line 110, valve 160 and line 108 through control valve 102 into the tank 104. The sequential operation of the piston rods in the three cylinders thus causes the sequential closing operations of the hatch cover, jacking device and dogging devices.

In the event that a four-step sequential operation is required, additional lines, valves and cylinders are provided to add the additional step. Where a two-step sequential operation is desired, the third cylinder is omitted along with any of the unnecessary valves.

Utilizing the apparatus described, it is obvious that by the manipulation of a single lever, all of the steps in the opening or closing of a hatch cover are sequentially and automatically performed.

It will be obvious to those skilled in the art that various changes may be made without departing from the spirit of the invention and therefore the invention is not limited to what is shown in the drawings and described in the specification but only as indicated in the appended claims.

What is claimed is:

1. In an articulating hatch cover, a pair of panels, hinges connecting the first said panel to one end of the hatch opening, intermediate hinges connecting the two said panels together, a first fluid motor means operatively connected to said hatch cover for opening and closing said hatch cover panels from a horizontal closed position to a vertical open position and reverse, dogging devices mounted adjacent said panels and operatively positioned to hold said panels in the closed position, a second fluid motor means attached to each said dogging device for actuating said dogging devices from an unlatched to a latched position and the reverse, a source of fluid under pressure, a first hydraulic control means for directing said pressure fluid to said first fluid motor means for actuating said first fluid motor means, and a second hydraulic control means structurally remote from and responsive to operation of the first said control means for actuating said second fluid motor means upon completion of operation of said first fluid motor means whereby said hatch cover is closed and dogged automatically and sequentially upon manually actuating said first hydraulic control means.

2. In an articulating hatch cover adapted to be sealed on to a coaming, a pair of panels, hinges connecting the first said panel to one end of the hatch opening, intermediate hinges connecting the two said panels together, a first fluid motor means operatively connected to said hatch cover for opening and closing said hatch cover panels from a horizontal closed position to a vertical open position and reverse, jacking devices operatively positioned for lowering said hatch cover into a seated position on said coaming, a second fluid motor means attached to each said jacking device for actuating it from a raised to a lowered position and the reverse, dogging devices mounted adjacent said cover and operatively positioned to hold said panels in the closed position, a third fluid motor means attached to each said dogging device for actuating said dogging device from a latched to an unlatched position and the reverse, a source of fluid under pressure, a first hydraulic control means for directing said pressure fluid to said first fluid motor means for actuating said first fluid motor means, a second hydraulic control means structurally remote from and responsive to operation of the first said control means for actuating said second fluid motor means upon completion of operation of said first fluid motor means, and a third hydraulic control means structurally remote from and responsive to operation of the second said control means for actuating said third fluid motor means upon completion of operation of said second fluid motor means, whereby said hatch cover is closed, sealed and dogged automatically and sequentially upon manually actuating said first hydraulic control means.

3. In an articulating hatch cover a section of said hatch cover comprising four panels, hinges connecting the outermost panel to one end of the hatch opening, intermediate hinges connecting the four said panels together, a first fluid motor means operatively connected to said innermost pair of panels for opening and closing said pair of panels from a horizontally closed position to a vertically open position and reverse, a second fluid motor means operatively connected to said outermost pair of panels for opening and closing said pair of panels from a horizontally closed position to a vertically open position and reverse, a source of fluid under pressure, a first fluid control means for directing said fluid under pressure to said first fluid motor means for actuating said first fluid motor means, and a second fluid control means structurally remote from and responsive to operation of the first said control means for actuating said second fluid motor means upon completion of operation of said first fluid motor means, whereby said hatch cover is completely moved from the closed to the open position upon manually actuating said first fluid control means.

4. In a hatch cover in accordance with claim 3, dogging devices mounted adjacent said panels and operatively positioned for latching and unlatching said panels in the closed position, a third fluid motor means operatively connected to each said dogging device for actuating said dogging devices simultaneously, and a third fluid control means structurally remote from and responsive to operation of the second said control means for actuating said third fluid motor means upon completion of operation of said second fluid motor means, whereby said hatch cover is automatically and sequentially closed and dogged upon manually actuating said first mentioned control means.

5. In a hatch cover in accordance with claim 3, a plurality of pairs of rollers on the under side of said hatch cover, jacking devices located adjacent the position of the rollers when the hatch cover is in the closed position for lowering said cover into a sealed position and the reverse, a third fluid motor means operatively connected to said jacking devices for operating said jacking devices simultaneously, and a third fluid control means structurally remote from and responsive to operation of the second said control means for actuating said third fluid motor means upon completion of operation of said second fluid motor means whereby said hatch cover is automatically and sequentially closed and sealed upon manually actuating said first control means.

6. In a hatch cover in accordance with claim 5 dogging devices mounted adjacent said cover and operatively positioned to hold said panels in the closed position, a fourth fluid motor means operatively connected to each said dogging device for actuating said dogging devices simultaneously from an unlatched to a latched position and the reverse, and a fourth fluid control means structurally remote from and responsive to operation of the third said fluid control means for actuating said fourth fluid motor means upon completion of operation of said third fluid motor means, whereby said hatch cover is automatically and sequentially closed, sealed and dogged upon manually actuating said first hydraulic control means.

References Cited in the file of this patent

UNITED STATES PATENTS

| | | |
|---|---|---|
| 2,179,495 | Court et al. | Nov. 14, 1939 |
| 2,301,028 | Esch | Nov. 3, 1942 |
| 2,351,284 | Overbeke | June 13, 1944 |
| 2,595,248 | Greer et al. | May 6, 1952 |
| 2,707,928 | Farrell | May 10, 1955 |